United States Patent [19]

Schulz et al.

[11] Patent Number: 4,475,687
[45] Date of Patent: Oct. 9, 1984

[54] DEVICE FOR HEATING AND VENTILATING LARGE-AREA VEHICLES

[75] Inventors: Joachim Schulz, Mudau/Odenwald; Werner Thelen, Buchen, both of Fed. Rep. of Germany

[73] Assignee: Aurora Konrad G. Schulz GmbH & Co., Mudau/Odenwald, Fed. Rep. of Germany

[21] Appl. No.: 509,856

[22] Filed: Jun. 30, 1983

[30] Foreign Application Priority Data

Jul. 5, 1982 [DE] Fed. Rep. of Germany ....... 3225089

[51] Int. Cl.³ .............................................. B60H 1/02
[52] U.S. Cl. ................. 237/12.3 A; 98/2.05; 237/12.3 B; 165/77
[58] Field of Search ................... 237/12.3 A, 12.3 B, 237/12.3 R; 98/2, 2.05, 2.06; 165/76, 77

[56] References Cited

U.S. PATENT DOCUMENTS

| 1,839,688 | 1/1932 | Lintern et al. | 237/12.3 A X |
| 2,360,617 | 10/1944 | Onishi et al. | 98/2.05 |
| 2,382,712 | 8/1945 | Hans | 98/2.05 |
| 2,704,205 | 3/1955 | Matulaitus | 237/12.3 A X |

FOREIGN PATENT DOCUMENTS 2843746 4/1980 Fed. Rep. of Germany ..... 237/12.3 A

Primary Examiner—Albert J. Makay
Assistant Examiner—Henry Bennett
Attorney, Agent, or Firm—Becker & Becker, Inc.

[57] ABSTRACT

The device for heating and ventilating large-area vehicles comprises a blower and a heat exchanger which are arranged within a two-part housing which includes a base surface, which forms an entry opening for recirculated air from the passenger area and an air exit opening. The recirculated air entry opening is provided with a recirculated air entry housing, and the air exit opening leads into a distribution passage.

13 Claims, 5 Drawing Figures

DEVICE FOR HEATING AND VENTILATING LARGE-AREA VEHICLES

BACKGROUND OF THE INVENTION

The present invention relates to a device for heating and ventilating large-area vehicles, such as buses, and comprises a housing having air entry and air exit openings, and at least one blower and one heat exchanger; the housing is arranged beneath the floor of the passenger area, and is provided with an open base surface, side walls, and end walls which at least partially converge towards the bottom; the current issuing from the blower proceeds at a relatively acute angle to the base surface of the housing, and also obliquely strikes the inlet side of the heat exchanger, the axis of through-flow of which, proceeding at right angles to the inlet and outlet sides, is inclined relative to the base surface at a greater acute angle than the current issuing from the blower; the portion of the base surface lying in the vertical projection of the outlet side of the heat exchanger forms the air outlet opening which leads to a distribution passage extending above the floor of the passenger area and in its longitudinal direction.

Such a device may be seen from German Offenlegungsschrift No. 28 43 746, which discloses a unit for heating and ventilating passenger areas in commercial vehicles. With uniform assembly, these units can be arranged at different locations in the commercial vehicle. The units are inexpensive in construction, and comprise at least one blower and one heat exchanger which are adapted to one another, and are arranged fixedly in relation to one another, in such a way that optimum possible efficiency is achieved irrespective of the nature of utilization. For this purpose the unit comprises a housing which is formed as a one-piece synthetic plastics trough with end and side walls converging from the open base surface to the bottom. The blower is arranged externally on the housing, and the mouth of its delivery pipe is inclined relative to the inlet side of the heat exchanger. The known device has a simple and compact assembly, so that it is suitable for widely differing utilization areas within the vehicle.

When the device is arranged beneath the floor of the passenger area, however, the problem arises that the externally situated blower has to be protected by additional measures, such as, for example, a wire mesh cage, in order to protect it within a luggage space against damage by luggage or—if as in town route buses there is no luggage space—to prevent the blower from being damaged by stones, water splashes, and the like. It is in fact known to arrange the heat exchanger and a blower beneath the floor of a passenger area within a closed housing the bottom of which has a repair access flap, but the housings themselves require considerable space since the heat exchanger and the blower are not arranged optimally in relation to one another. The air flow is deflected several times within the housing. Thus, optimum efficiency is not guaranteed. Moreover, a free space must be provided beneath the housing arranged beneath the floor of the passenger area; this free space corresponds at least to the height of the heat exchanger or the blower, so that these elements can be drawn downwards out of the housing and then removed laterally from, for example, the luggage space. Even if a sufficiently large free space is available, this work is expensive since the blower specifically, which needs frequent attention, is not directly accessible from outside.

In view of the above, it is an object of the present invention to make the blower of the device, which is arranged beneath the floor of the passenger area, accessible from different sides, especially from the exterior, without sacrificing the optimum efficiency of the device with respect to flow.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
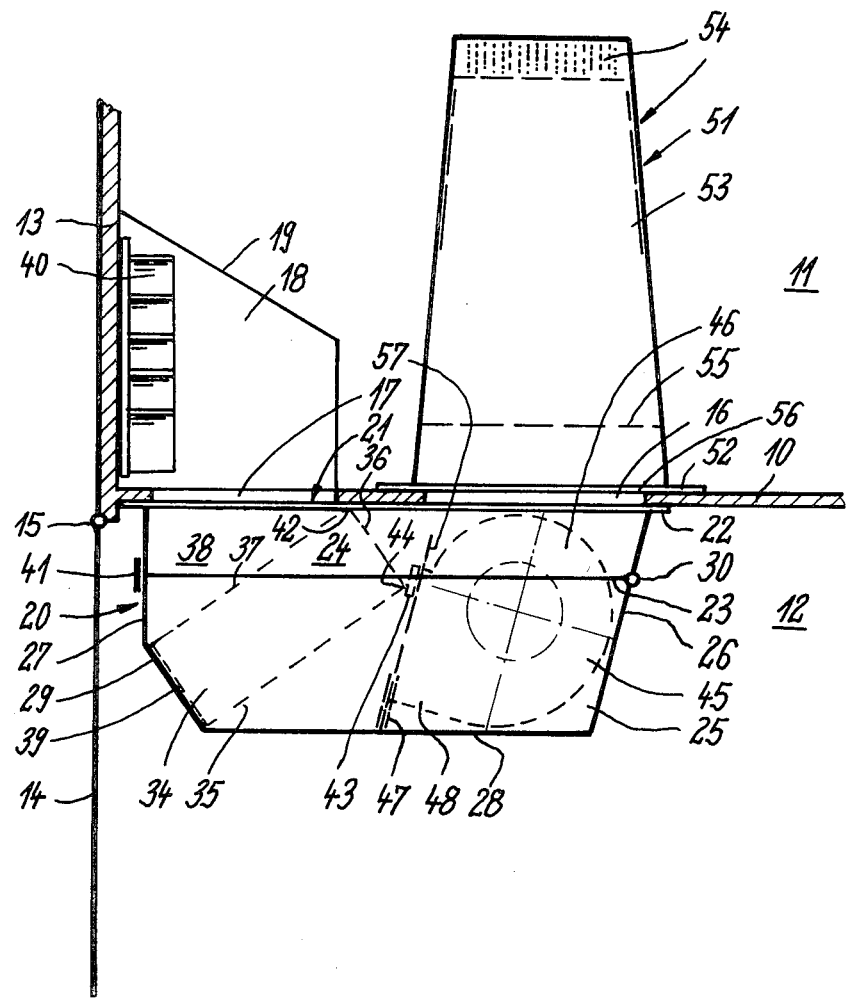
FIG. 1 shows one embodiment of the inventive device with the housing closed, in lateral elevation.

The device of the present invention is characterized primarily in that the base surface of the housing also forms the entry opening for recirculated air from the passenger area; that the housing is of two-part construction and has a division which is substantially parallel to the base surface; that between the base surface and the division a frame of reactangular outline is provided in which the heat exchanger is suspended in such a manner that it protrudes from the frame and beyond the division; that beneath the frame and the division a trough is arranged which includes a retaining fitting for the blower, which in the region of the recirculated air entry opening extends into the frame; and over the entire width of the housing, in the region of that edge of the heat exchanger which lies on the inlet side of the heat exchanger next to the division, a seal is provided between the heat exchanger and the delivery pipe of the blower.

Thus the advantage is achieved that the relatively large base surface of the housing forms not only the air exit opening but also the entry opening for recirculated air from the passenger area, the floor of which has an aperture of appropriate dimensions. This makes it possible for the blower to be accessible and replaceable from the passenger area. On the other hand, the blower can also be conveniently reached from the outside of the large-area vehicle for maintenance work and if necessary replacement. The trough containing the blower can be pivoted away from the frame and/or can be removed, so that work on the blower is not hindered by the heat exchanger, which in any case is arranged at an inclination. The frame is secured to the under side of the floor of the passenger area by means of its flange. The substantially maintenance-free heat exchanger is suspended in the frame, and its water connections can be conducted through the wall of the frame or the air exit opening and can then be conducted, on the under or upper side of the floor, within the distribution passage to the internal combustion engine. The hot air part is sealed off from the cold air part, or the delivery side is sealed off from the suction side, by the relatively simple seal between the heat exchanger and the delivery pipe of the blower. The blower or blowers, preferably radial blowers such as cross-current blowers, are fixedly mounted in the trough so that the air flow always strikes in the same manner upon the likewise fixedly installed heat exchanger. The air flow strikes at an acute angle upon the inlet side of the heat exchanger, which lies regularly at about 50°. In this way a uniform flow results upon the entire inlet side of the heat exchanger, the arrangement being such that in the region of the inlet side a relatively slight deflection of the air flow takes place, and on the outlet side the air flow likewise has to be deflected relatively little. Moreover the total base surface of the housing offers relatively large air entry and air exit cross-sections. Thus, the device is designed for the best possible performance, which is valid both as regards the air flow and as regards the heat transmission, since the heat exchanger always receives the air flow constantly over the entire area. Thus the device is equally suitable for operation under partial load, without too great a drop in performance being noticeable. Not only the trough but also the frame can have end and side walls which converge from the base surface to the bottom, so that the housings are stackable. In this way advantages in manufacture, air flow, and transport are combined with one another.

Pursuant to further advantageous developments of the present invention, within the frame and parallel to its end walls a partition may be provided which is made somewhat resilient in the region of the division. Alternatively, within the frame and parallel to its end walls a partition may be provided which includes a seal in the region of the division.

The side walls of the trough may include two retaining fittings, arranged in conformity with the inclination of the mouth of the delivery pipe of the blower, for the fixing of the blower.

Above an air entry space for the blower, the floor of the passenger area may have an aperture in the form of a recirculated air entry opening. On the upper side of the floor, this recirculated air entry opening is advantageously covered by a recirculated air entry housing, which can be of frusto-pyramidal formation, and can have upper and/or lateral recirculated air inlets. The recirculated air entry housing may be of asymmetrical construction and, in the direction of travel, may have a high frusto-pyramidal section which is provided with the recirculated air inlets, and a very low section which widens the interior space of the high section in the region of the base surface of the recirculated air entry housing in conformity with the aperture in the floor of the passenger area, i.e., in conformity with the recirculated air entry opening of the base surface of the frame. For maintenance or replacement of the blower from the passenger area, it is therefore merely necessary to remove the recirculated air entry housing. The low section may be formed externally as a footrest, and may be reinforced by ribs.

That end wall of the housing lying in the region of the blower may, between the frame and the trough, be provided with a hinge which permits separation of the trough with the blower from the frame with the heat exchanger when the trough is partially pivoted away from the frame. After the trough has been partially pivoted away from the frame, the hinge parts of the trough can be separated from those of the frame by lateral displacement. Alternatively after the trough has been partially pivoted away from the frame, the hinge parts of the trough can be separated from those of the frame by displacement of the trough relative to the frame in the direction of the rear end wall.

The rear end wall of the trough may be provided with entry slots for fresh air from the under-floor space of the vehicle.

DESCRIPTION OF A PREFERRED EMBODIMENT

Referring now to the drawings in detail, FIG. 1 shows diagrammatically in cross-section, the floor 10 of a passenger area 11 of a bus. In the illustrated embodiment, a luggage space 12 is situated beneath the floor 10. The side wall of the vehicle is designated by 13. In the region of the luggage space 12, the side wall 13 has a flap 14 hinged at 15. The floor 10 is provided, near the side wall 13, with a rectangular aperture 17 which leads into a distribution passage 18 which extends in the longitudinal direction of the passenger area 11 and is limited by a housing 19 provided with air exit openings or nozzles (not shown). Beside and at a distance from the aperture 17, a further aperture 16 is provided in the floor 10.

The heating and ventilating device has a housing 20 which is made in two parts and has a base surface 21 surrounded by a flange 22. The housing 20 is secured by means of the flange 22 to the under side of the floor 10. A seal is expediently provided between the flange 22 and the under side of the floor 10. The housing 20 has a division 23 which is substantially parallel to the base surface 21. Between the base surface 21 and the division 23 there is provided a frame 24 of rectangular outline, and beneath the frame 24 and the division 23 there is a trough 25. The frame 24 and the trough 25 expediently consist of synthetic plastics material, and are produced by the deep-drawing method, by injection molding, or according to another suitable method. They can consist of polyurethane, hard PVC, polyester, or the like, with or without fiber reinforcement. At least the end walls 26 and 27 of the trough 25 converge in the direction of the bottom 28 of the trough 25. A transition section 29 is provided between the end wall 27 and the bottom 28.

Figure 5:
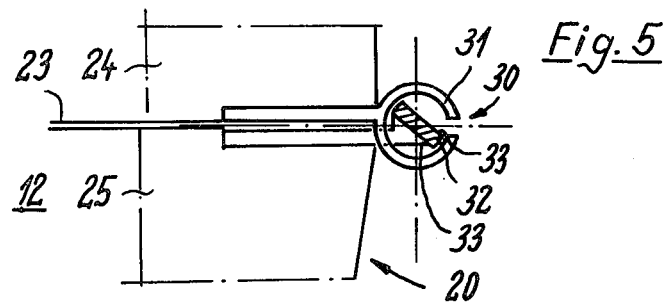
FIG. 5 shows a side view of the hinge between the trough and the frame.

In the region of the end wall 26, the trough 25 is articulated by means of a hinge 30 to the frame 24. The hinge or hinges 30 are designed in such a way that after the trough 25 is pivoted partially away from the frame 24, the hinge parts of the trough 25 can be separated from those of the frame 24 by lateral shifting, or due to the fact that the trough 25 is shifted relative to the frame 24 in the direction of the rear end wall 26. In the first exemplary embodiment, the hinges 30 have hinge pins from which the bushings of the other hinge parts can be withdrawn laterally. In the second exemplary embodiment of the hinge 30 according to FIG. 5, there is arranged on the frame 24 a hinge part in the form of a slotted bushing 31, the slot of which is aligned with the division 23. Within the bushing 31 there is guided a journal 32 of flat rectangular cross-section, the wide sides 33 of which are inclined at an angle to the division 23 which corresponds to the desired angle of opening of the trough 25 in relation to the frame 24 when the trough 25 is to be separated from the frame 24.

Figure 3:
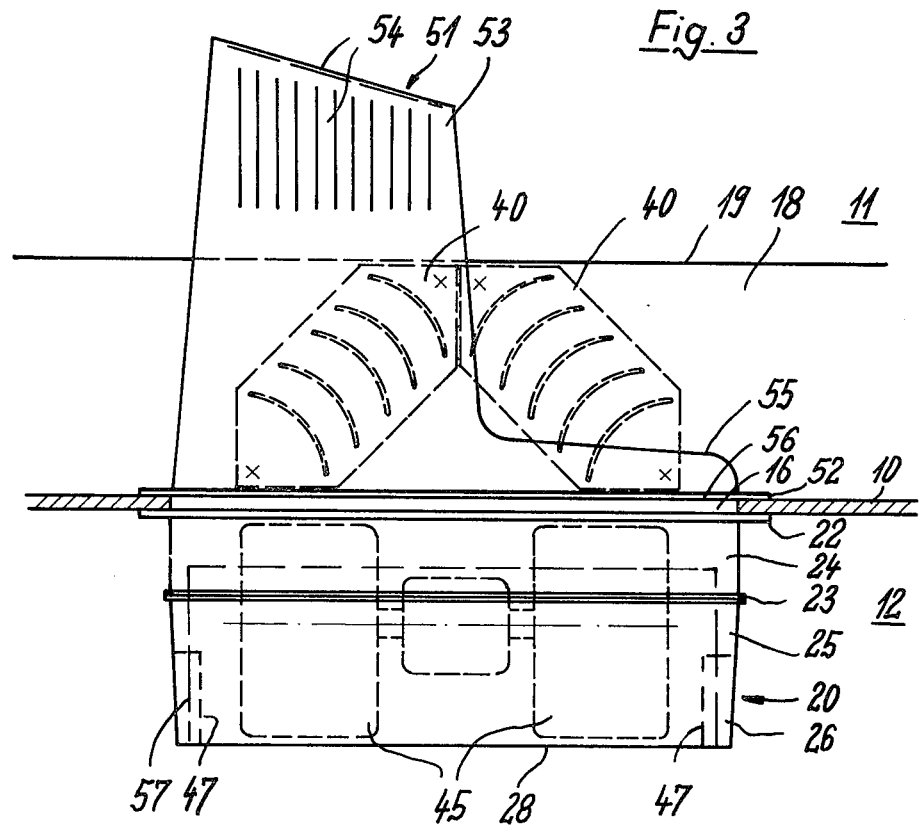
FIG. 3 shows an end view of the device.

A heat exchanger 34 is suspended in the frame 24 in such a way that it stands out far from the frame 24 and beyond the division 23. The heat exchanger 34 has an inlet side 35 and an outlet side 37 for the air flow which is to be heated. The upper wall of the heat exchanger 34 is designated by 36, and its floor by 39. The floor 39 lies directly against the transition section 29 of the trough 25. The inlet side 35 and the outlet side 37 of the heat exchanger 34 are inclined at an angle of 35° to the base surface 21 in the exemplary embodiment illustrated. In this way a prismatic air exit space 38 results between the outlet side 37, the end wall 27, and the aperture 17, rendering possible a largely loss-free passage of the air flow into the distribution passage 18. The latter—as indicated in FIG. 3—can, above the aperture 17, be provided with air deflector elements 40 which also suppress the formation of secondary turbulence. Moreover, the water connections of the heat exchanger 34 can be provided in the prismatic air exit space 38, and can be conducted to the exterior through the wall of the frame 24 or an aperture in the wall of the trough 25, if the supply conduits are disposed on the under side of the floor 10. If the water supply conduits are conducted through the distribution passage 18 to the heat exchanger 34, the connections reach through the aperture 17.

In the region of the flap 14, the frame 24 and the trough 25 are held together by clips or the like 41 which are arranged at the division 23 opposite to the hinges 30.

Within the trough 25 is arranged a radial blower 45 which is situated in an air entry space 46 provided beneath the aperture 16 in the region of the end wall 26 of the trough 25. The air entry space 46 is fed with recirculated air from the passenger area 11, and possibly with fresh air which can be supplied through fresh air openings (not shown) in the end wall 26. The blower 45 is pushed with an attachment wall 57 of its delivery pipe 48 into retaining fittings 47 which are provided on the side walls of the trough 25. The blower 45 can be supported additionally on the end wall 26 and/or the bottom 28 of the trough 25—resilient inserts being used if desired. As can be seen from FIG. 1, the blower 45 reaches as far as the base surface 21, and is thus arranged in a space-saving manner within the housing 20. The delivery pipe 48 of the blower 45 is arranged at an angle of about 75° to the base surface 21. Consequently, the air current issues from the delivery pipe 48 at a relatively acute apex angle of 15° relative to the base surface 21, and strikes obliquely upon the inlet side 35 of the heat exchanger 34. The axis of through-flow of the heat exchanger 34 is inclined relative to the base surface 21 at a greater acute angle of about 55°, at which the air current also leaves the heat exchanger 34 and is guided obliquely, that is largely without loss, into the distribution passage 18.

That edge of the heat exchanger located between the upper wall 36 and the outlet side 37 of the heat exchanger 34 is designated by 42. The edge 42 can abut in the plane of the flange 22 on the seal (not shown) which is provided between the flange 22 and the inner side of the floor 10.

The edge between the upper wall 36 and the inlet side 35 of the heat exchanger 34 is designated by 44. Between the edge 44 and the delivery pipe 48 of the blower, a sealing strip 43 is provided which can consist of foam material. The sealing strip 43 extends over the entire width of the housing 20 and, abutting on the attachment wall 57, in combination with the closed upper wall 36 of the heat exchanger 34, it separates the air entry space 46 from the air exit space 38.

Figure 2:
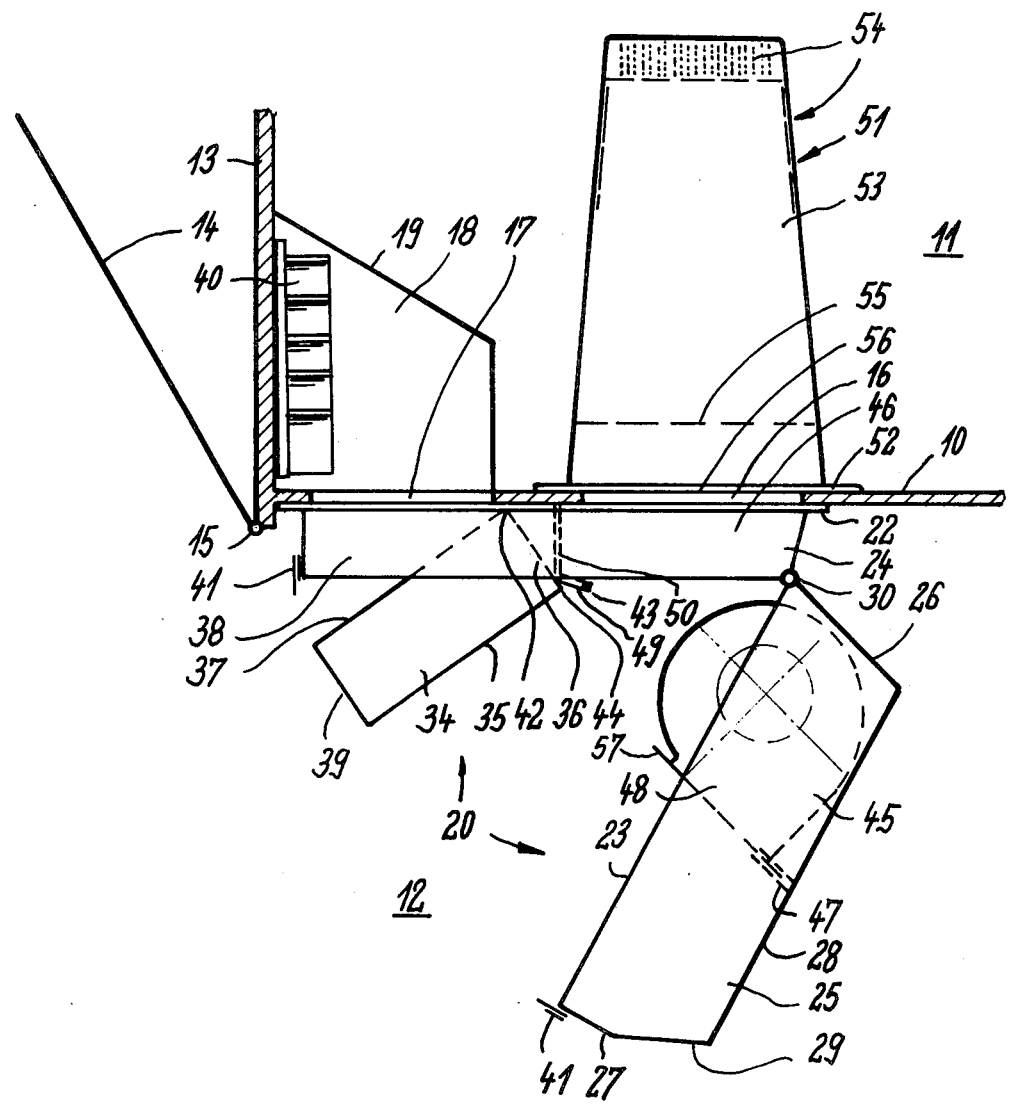
FIG. 2 shows the device with a somewhat modified, opened housing, in lateral elevation.

As shown in FIG. 2, the frame 24 can be provided with a partition 50 which extends within the frame 24, parallel to its end walls, over the entire width of the frame and at right angles to the base surface 21 and the division 23. The partition 50 can have an angled-off portion 49 in the region of the division 23, which portion is resiliently yieldable and comprises a seal at its free edge, similar to the sealing strip 43. With this seal, or the free edge, the angled-off portion 49 rests along the entire width of the housing 20 on the attachment wall 57, and thus separates the air entry space 46 from the air exit space 38.

Inside the passenger area 11, a recirculated air entry housing 51 is arranged above the aperture 16. The recirculated air entry housing 51 has a flange 52 which is provided on the upper side of the floor 10 parallel to the flange 22 of the housing 20. The recirculated air entry housing 51 is substantially frusto-pyramidal, yet asymmetric. It has a high frusto-pyramidal section 53, preferably facing in the direction of travel of the vehicle, with lateral recirculated air inlets 54. These are provided with reinforcing ribs (not shown) which at the same time prevent paper and refuse from being sucked in. Beside the high section 53 there is provided a very low section 55 which adapts the interior space of the high section 53, in the region of the base surface 56, to the aperture 16 in the floor 10 of the passenger area. The transition is made streamlined. The low section 55 is formed externally as a footrest, and may be appropriately reinforced by ribs. The base surface 56 and the aperture 16 form an elongated rectangle which extends in the direction of travel, parallel to the distribution passage 18.

The aperture 16 is dimensioned such that after the recirculated air entry housing 51 is removed, the blower 45 not only can be reached for maintenance work, but also can be drawn through the aperture 16.

Recirculated air inlets 54 can be arranged as well, or alternatively, in the top surface of the high frusto-pyramidal section 53, which expediently rises in the direction of travel (FIG. 3).

Sealing inserts (not shown) of foam material or the like can be arranged on both sides of the attachment wall 57 in the region of the retaining fittings 47 between the attachment wall 57 and the adjacent side walls of the housing 20 (FIG. 3).

Figure 4:
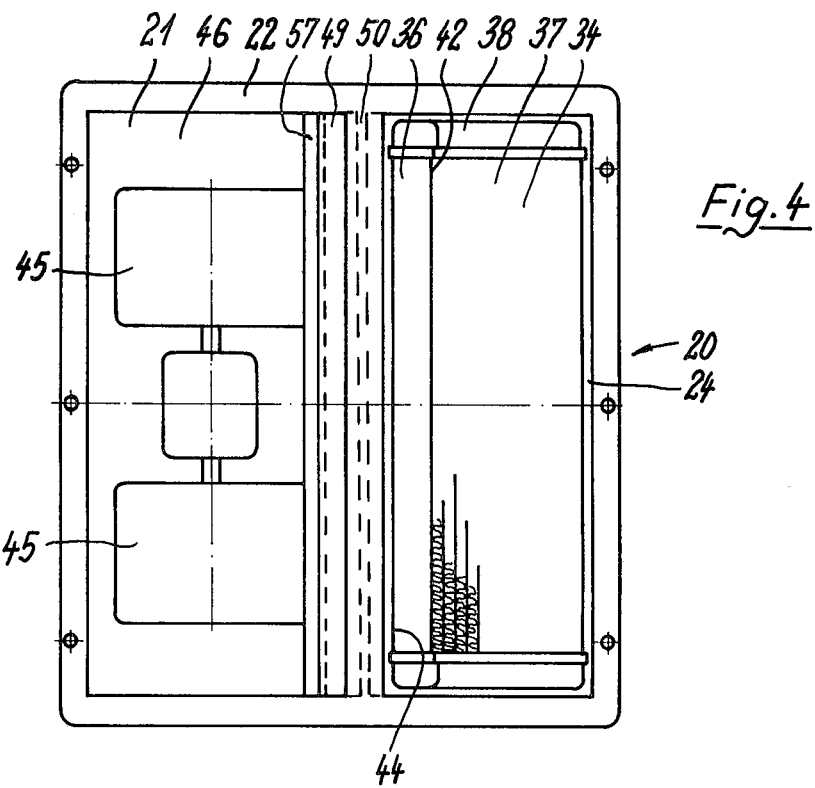
FIG. 4 shows a plan view of the housing according to FIG. 2.

In the illustration in FIG. 4, for the sake of better representation, the heat exchanger 34 is raised somewhat so that the upper wall 36 is not situated in its operating position, which is correctly illustrated in FIG. 2 with regard to the heat exchanger 34.

The present invention is, of course, in no way restricted to the specific disclosure of the specification and drawings, but also encompasses any modifications which fall within the scope of the appended claims.

What we claim is:

1. A device for heating and ventilating large-area vehicles which have a passenger area, a floor, and a distribution passage disposed above said floor and extending in the longitudinal direction of said passenger area; said device comprising:

a housing, which is provided with air entry and air exit openings, is adapted to be arranged beneath said floor of said passenger area, and is provided with an open base adapted to face said floor, a bottom remote from said open base, two side walls, and two end walls which converge at least partially toward said bottom of said housing; said housing being of two-part construction, with a division, which is substantially parallel to said open base, dividing said housing into a frame part and a trough part; said frame part of said housing being of rectangular construction, with said open base of said housing being part of said base part, and with said bottom of said housing being part of said trough part; a portion of said open base of said housing forming said air entry opening, which is for recirculated air from said passenger area;

at least one blower, which is accommodated in said housing and has a delivery pipe adapted to discharge an air flow;

at least one heat exchanger suspended in said frame part of said housing in such a way that it protrudes from said frame part and beyond said division away from said open base; said heat exchanger having an inlet side for receiving said air flow discharged from said blower, and an outlet side which communicates with said air exit opening of said housing; that portion of said open base of said housing which lies in the vertical projection of said outlet side of said heat exchanger forms said air exit opening, which communicates, via a first aperture in said floor, with said distribution passage; said heat exchanger being arranged in such a way that on its inlet side it has an edge adjacent to said division;

a retaining fitting provided in said trough part of said housing for receiving said blower, which, in the region of said recirculated air entry opening of said open base of said housing, extends into said frame part of said housing; said blower and said heat exchanger being arranged in such a way that said air flow discharged from said blower proceeds at a relatively acute angle relative to said open base of said housing and obliquely strikes said inlet side of said heat exchanger; the axis of through-flow of said heat exchanger being at right angles to said inlet and outlet sides of said heat exchanger, and being inclined relative to said open base of said housing at an acute angle which is greater than the acute angle of said air flow discharging from said blower; and a seal provided between said heat exchanger and said delivery pipe of said blower over the entire width of said housing in the region of said edge of said heat exchanger which lies on the inlet side thereof adjacent to said division.

2. A device according to claim 1, which includes a partition disposed within said frame part of said housing parallel to said end walls thereof; said partition being somewhat resilient in the region of said division.

3. A device according to claim 1, which includes a partition disposed within said frame part of said housing parallel to said end walls thereof; said partition being provided with a seal in the region of said division.

4. A device according to claim 1, in which, in order to fix the position of said blower, said side walls of said trough part of said housing are provided with two retaining fittings arranged in conformity with the inclination of the mouth of said delivery pipe of said blower.

5. A device according to claim 1, in which, in the vicinity of said recirculated air entry opening of said open base, said floor of said passenger area is provided with a second aperture which communicates with said recirculated air entry opening; and which includes a recirculated air entry housing which communicates with and covers said second aperture in said floor on that side thereof remote from said housing.

6. A device according to claim 5, in which said recirculated air entry housing is frusto-pyramidal and is provided with recirculated air inlets.

7. A device according to claim 6, in which said recirculated air entry housing is of asymmetrical construction and includes, in the direction of travel of said vehicle, a high frusto-pyramidal section which is provided with recirculated air inlets, and a very low section which widens the interior space of said high section, in that region of said air entry housing which faces said floor, in conformity with said second aperture of said floor, i.e., in conformity with said recirculated air entry opening of said open base of said housing.

8. A device according to claim 7, in which said low section of said recirculated air entry housing is formed externally as a footrest.

9. A device according to claim 8, in which said low section of said recirculated air entry housing is provided with reinforcing ribs.

10. A device according to claim 1, in which that end wall of said housing which is closest to said blower includes a hinge in the vicinity of said division between said frame part and said trough part of said housing, said hinge permitting pivoting of said trough part relative to said frame part, and also permitting separation of said trough part, which accommodates said blower, from said frame part, which accommodates said heat exchanger, when said trough part is partially pivoted away from said frame part.

11. A device according to claim 10, in which said hinge includes parts associated with said frame part of said housing, and parts associated with said trough part of said housing; and in which, after said trough part is partially pivoted away from said frame part, said hinge parts of said trough part can be separated from said hinge parts of said frame part by lateral displacement.

12. A device according to claim 10, in which said hinge includes parts associated with said frame part of said housing, and parts associated with said trough part of said housing; and in which, after said trough part is partially pivoted away from said frame part, said hinge parts of said trough part can be separated from said hinge parts of said frame part by displacement of said trough part, relative to said frame part, in the direction of that end wall of said housing which is closest to said blower.

13. A device according to claim 1, in which that end wall of said housing closest to said blower is provided on said trough part with entry slots for fresh air from that space of the vehicle located below said floor thereof.

* * * * *